(12) United States Patent
Booman et al.

(10) Patent No.: US 9,361,154 B2
(45) Date of Patent: *Jun. 7, 2016

(54) TUNABLE COMPUTERIZED JOB SCHEDULING

(71) Applicant: International Business Machines Corporation, Armonk, NY (US)

(72) Inventors: Gordon Booman, Berlin, MA (US); David Kalmuk, Toronto (CA); Torsten Steinbach, Holzgerlingen (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/501,171

(22) Filed: Sep. 30, 2014

(65) Prior Publication Data
US 2016/0092269 A1    Mar. 31, 2016

(51) Int. Cl.
| | | |
|---|---|---|
| G06F 9/455 | (2006.01) | |
| G06F 9/46 | (2006.01) | |
| G06F 9/48 | (2006.01) | |
| G06F 9/54 | (2006.01) | |
| G06F 9/50 | (2006.01) | |

(52) U.S. Cl.
CPC .............. *G06F 9/4887* (2013.01); *G06F 9/542* (2013.01); *G06F 9/4881* (2013.01); *G06F 9/505* (2013.01)

(58) Field of Classification Search
CPC ........................................... G06F 9/48–9/4893
See application file for complete search history.

(56) References Cited

U.S. PATENT DOCUMENTS

| | | |
|---|---|---|
| 6,714,960 B1 | 3/2004 | Bitar et al. |
| 7,360,216 B2 | 4/2008 | Spoltore et al. |

(Continued)

OTHER PUBLICATIONS

Jacek Kobus, Completely Fair Scheduler and its tunning, 2009, pp. 1-8.*

(Continued)

*Primary Examiner* — Thuy Dao
*Assistant Examiner* — Mongbao Nguyen
(74) *Attorney, Agent, or Firm* — Robert C. Bunker; Steven C. Kurlowecz

(57) ABSTRACT

A computer-implemented method for scheduling a set of jobs executed in a computer system can include determining a workload-time parameter for a set of at least one job. The workload-time parameter can relate to execution-time parameters for the set of at least one job. The method can include determining a schedule tuning parameter for the set of at least one job, the schedule tuning parameter based on the workload-time parameter. The method can include generating a scheduling factor for each job in the set, the scheduling factor generated based on the schedule tuning parameter. The method can include scheduling the set of at least one job based on the scheduling factor.

10 Claims, 6 Drawing Sheets

(56) References Cited

U.S. PATENT DOCUMENTS

| | | | | |
|---|---|---|---|---|
| 8,037,475 | B1* | 10/2011 | Jackson | G06F 9/5027 709/224 |
| 8,176,490 | B1* | 5/2012 | Jackson | G06F 9/468 718/100 |
| 8,180,943 | B1 | 5/2012 | Priem | |
| 8,214,836 | B1 | 7/2012 | Markov | |
| 8,245,234 | B2 | 8/2012 | Krishnakumar et al. | |
| 8,490,108 | B2 | 7/2013 | Kikuchi | |
| 8,555,281 | B1 | 10/2013 | Van Dijk et al. | |
| 2002/0078121 | A1* | 6/2002 | Ballantyne | G06F 9/4887 718/102 |
| 2007/0136729 | A1* | 6/2007 | Neuman | G06F 9/4887 718/102 |
| 2008/0022284 | A1* | 1/2008 | Cherkasova | G06F 9/4881 718/104 |
| 2008/0066070 | A1* | 3/2008 | Markov | G06F 9/4818 718/103 |
| 2008/0178180 | A1* | 7/2008 | Sporny | G06F 9/4887 718/102 |
| 2008/0271030 | A1* | 10/2008 | Herington | G06F 9/4881 718/104 |
| 2009/0222831 | A1* | 9/2009 | Schneider | G06F 9/4881 718/103 |
| 2011/0225591 | A1* | 9/2011 | Wada | G06F 9/45533 718/103 |
| 2012/0066683 | A1 | 3/2012 | Srinath | |
| 2012/0144394 | A1* | 6/2012 | Prabhakar | G06F 9/4893 718/102 |
| 2013/0104140 | A1* | 4/2013 | Meng | G06F 9/5066 718/104 |
| 2013/0139170 | A1* | 5/2013 | Prabhakar | G06F 9/4893 718/104 |
| 2013/0312006 | A1* | 11/2013 | Hardman | H04L 67/1008 718/105 |
| 2014/0026144 | A1* | 1/2014 | Pack | G06F 9/505 718/105 |
| 2014/0130056 | A1* | 5/2014 | Goodman | G06F 9/5044 718/104 |
| 2014/0259018 | A1* | 9/2014 | Jain | G06F 9/4881 718/102 |
| 2014/0344814 | A1* | 11/2014 | Jamjoom | G06F 9/4881 718/101 |
| 2014/0380279 | A1* | 12/2014 | Bartley | G06F 11/3676 717/124 |

OTHER PUBLICATIONS

Pinky Rosemarry, Grouping based job scheduling algorithm using priority queue and hybrid algorithm in grid computing, 2012, pp. 1-11.*

Mario Pastorelli, Practical Size-based Scheduling for MapReduce Workloads, 2013, pp. 1-12.*

Yi Yao, Using a Tunable Knob for Reducing Makespan of MapReduce Jobs in a Hadoop Cluster, 2013, pp. 1-8.*

Zhi-Feng Yu, Queue Waiting Time Aware Dynamic Workflow Scheduling in Multicluster Environments, 2010, pp. 1-10.*

Barman et al., "Dynamic Time Quantum in Shortest Job First Scheduling Algorithm (DTQSJF) for Unpredictable Burst Time of Processes", International Journal of Computer Science & Engineering Technology (IJCSET), Mar. 2013, pp. 208-212, vol. 4, Issue 03, ISSN: 2229-3345 http://www.ijcset.com/docs/IJCSET13-04-03-031.pdf.

Kobus et al., "Completely Fair Scheduler and its tuning1", 1-This draft article is based on R.Szklarski's M.S. thesis, Torun, 2009, 8 pages http://www.fizyka.umk.pl/~jkob/prace-mag/cfs.pdf.

Tanenbaum, A., "Modern Operating Systems, Third Edition", Prentice Hall, Upper Saddle River, NJ, 2007. ISBN 0-13-600663-9, © 2009 Pearson Education, Inc.

Unknown, "Chapter 14. Tuning the Task Scheduler", SUSE Linux Enterprise Server System Analysis and Tuning Guide, Jun. 25, 2012, Copyright © 2006-2012 Novell, Inc. and contributors http://doc.opensuse.org/products/draft/SLES/SLES-tuning_sd_draft/cha.tuning.taskscheduler.html#sec.tuning.taskscheduler.cfs.

Wang et al., "Preemptive ReduceTask Scheduling for Fair and Fast Job Completion", 10th International Conference on Autonomic Computing (ICAC '13), 2013, pp. 279-289, USENIX Association http://0b4af6cdc2f0c5998459-c0245c5c937c5dedcca3f1764ecc9b2f.r43.cf2.rackcdn.com/11771-icac13_wang_0.pdf.

Booman et al., "Tunable Computerized Job Scheduling", U.S. Appl. No. 14/707,078, filed May 8, 2015.

List of IBM Patents or Patent Applications Treated as Related.

* cited by examiner

TUNABLE COMPUTERIZED JOB SCHEDULING

BACKGROUND

Aspects of the present disclosure relate to computerized job scheduling, and more specifically, to a tunable computerized job scheduling system.

Jobs are instructions to a computer system which require a response from the computer system. For example, a job could include accessing information stored in a database to update customer bank accounts to reflect debits and credits that occurred during the day. The computer system could perform the updating process in response to receiving the job. To execute the instructions associated with jobs, the computer system requires computing resources such as memory, processing power, and other computer resources. Additionally, time is required for those computing resources to execute the jobs. The computer system can organize execution of the jobs according to a scheduling protocol to manage various job instructions.

SUMMARY

According to embodiments of the present disclosure, a computer-implemented method for scheduling a set of jobs executed in a computer system is disclosed. The method can include providing a schedule tuning parameter for a set of at least one job, the schedule tuning parameter relating to a workload-time parameter for the set of at least one job. The method can include generating a scheduling factor for each job in the set, the scheduling factor generated based on the schedule tuning parameter. The method can include scheduling the set of at least one job based on the scheduling factor.

In embodiments, the providing of the schedule tuning parameter can include determining a workload-time parameter for a set of at least one job, the workload-time parameter relating to execution-time parameters for the set of at least one job. The method can include determining a schedule tuning parameter for the set of at least one job, the schedule tuning parameter based on the workload-time parameter.

Embodiments of the present disclosure are directed toward a system for scheduling a set of jobs in a computerized job scheduling system. The system can include a logic device configured to receive a set of at least one job. The system can include a tunable scheduler module configured to determine a workload-time parameter for the set of at least one job. The tunable scheduler module can be configured to determine a schedule tuning parameter based on the workload-time parameter and generate a scheduling factor based on the schedule tuning parameter. The tunable scheduler module can be configured to schedule each job in the set of at least one job based on the scheduling factor.

Embodiments of the present disclosure are directed toward a computer program product for scheduling a set of jobs executed in a computer system. The computer program product can include a computer readable storage medium having program instructions embodied therewith. The program instructions can be executable by a computer, to cause the computer to determine a workload-time parameter for a set of at least one job. The computer can be caused to determine a schedule tuning parameter for the set of at least one job, the schedule tuning parameter based on the workload-time parameter. The computer can be caused to generate a scheduling factor for each job in the set, the scheduling factor generated based on the schedule tuning parameter. The computer can be caused to schedule the set of at least one job based on the scheduling factor.

The above summary is not intended to describe each illustrated embodiment or every implementation of the present disclosure.

BRIEF DESCRIPTION OF THE SEVERAL VIEWS OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
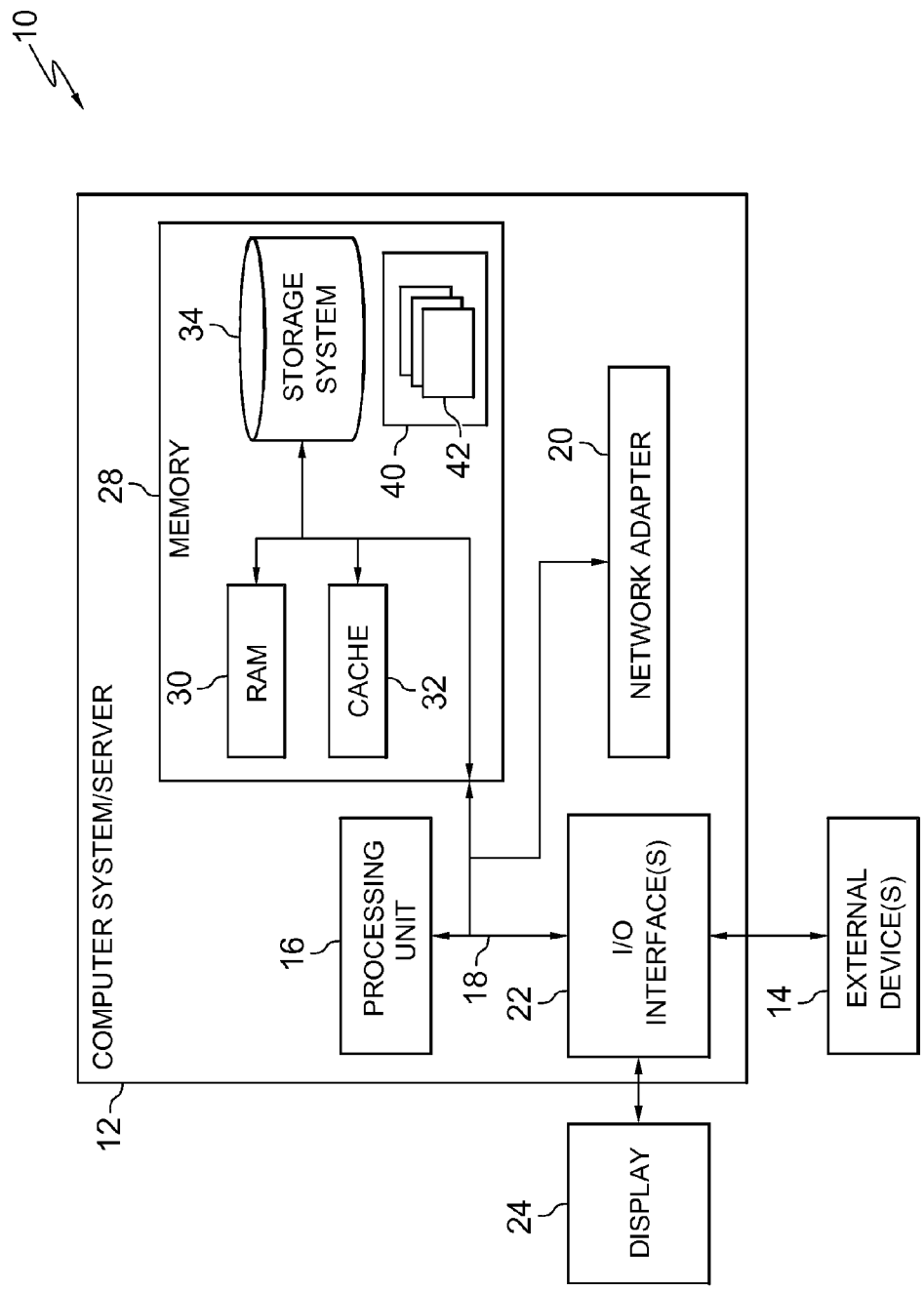
FIG. 1 depicts a cloud computing node according to an embodiment of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to computerized job scheduling, more particular aspects relate to a tunable computerized job scheduling system. While the present disclosure is not necessarily limited to such applications, various aspects of the disclosure may be appreciated through a discussion of various examples using this context.

While various numbers may be used to identify same named elements within disclosure, this practice is not intended to limit the scope of the disclosure. Identified elements in one figure may be the same or substantially similar to other same named elements in other figures.

Embodiments of the present disclosure are directed to a computer system for tunable scheduling of a set of jobs. Referred to herein, jobs are instructions to a computer system, such as a database management system, or other suitable computer system which require a response from the computer system. For example, a job could be a request to update a database of customer account information with data from various transactions which occurred that day. The computer system could perform the update request response to receiving the job. In embodiments, the jobs can be batch jobs, submitted to a system in batch/non-interactively. In certain embodiments, the jobs can be submitted to the system interactively. In certain embodiments, the system can receive both interactive and non-interactive jobs at the same time.

To execute the instructions associated with jobs, the computer system requires computing resources including, but not limited to, memory, processing power, and storage. Additionally, time can be required for those computing resources to execute the jobs. In some instances, the time it takes to execute a particular job is dependent on the complexity of the job and the volume of data involved. For example, a job involving updating ten million bank accounts with transactions for a day can require more time to execute in comparison to a job involving updating a few thousand accounts. The total time it takes a computer system to execute a particular job is referred to herein as an execution-time parameter.

In embodiments, the computer system can allocate computing resources among a set of jobs which are executed concurrently. For example, the system could receive a first job requiring the computer system to execute a first application. While the system is executing the application, the system could receive a second job instruction to execute a second application. In response to receiving the second job, the system could allocate resources to execute the second job while maintaining some resources to continue execution of the first job.

In some instances, the greater the number of jobs executed concurrently, the greater the computing resources required by the computer system to execute those jobs. However, when the system only has access to finite computing resources, too many jobs can strain access to computing resources. This can result in delayed job execution and can cause errors in the computer system. For example, if the computer system is executing a large number of jobs requiring total memory resources to execute which exceed memory available to the system, the system could experience slowdowns, crashes, or other errors.

The computer system can use a scheduling protocol to organize execution of a set of jobs in order to reduce slowdowns, crashes, or other errors in the system due to reaching resource limits.

In embodiments, the system could utilize a first-in-first-out (FIFO) protocol where the system executes jobs in order based on a queue-time parameter, which represents how long each job has been waiting to be executed. For example, the system operating under FIFO protocol can receive a set of jobs and begin executing those jobs in descending order of the queue-time parameter.

In embodiments, the system could utilize a shortest job first (SJF) protocol where the system executes jobs based on the execution-time parameter for each job. For example, the system operating under the SJF protocol can receive a set of jobs and begin executing those jobs in order of ascending of the execution-time parameter for those jobs. In embodiments, if additional jobs are received, the system can preempt and re-queue a currently executing job if an additional job with a smaller execution-time parameter than the estimated remaining execution for the currently executing job.

In certain embodiments, the system could utilize a relative latency (RL) protocol where the system executes jobs based on a ratio of the queue-time parameter to the execution-time parameter for each job. For example, the system operating under the RL protocol can receive a set of jobs and begin executing those jobs in order of descending of the ratio of queue-time parameter to execution-time parameter.

The system can be configured to operate between the various scheduling protocols based on preferences of a user. For example, preferences could include providing "fairness" in executing jobs scheduled in the system, reducing system complexity, reducing total computing resource use, and other various preferences. Thus, the system could be configured to operate according a particular scheduling protocol based on how each scheduling protocol satisfied the user preferences.

For example, some users could adopt an opinion that user preferences are accomplished in the system by executing jobs in the sequence of arrival, i.e. using the FIFO protocol as described herein. For example, a user could determine that FIFO protocol reduces system complexity and results in a relatively fair ordering of jobs. However, some users could consider the FIFO protocol to be unfair in some instances. For example, a set of jobs with a large execution-time parameter ("large jobs") could consume a large amount of the available resources in the system. Subsequently arriving jobs with a small execution-time parameter ("small jobs") could have to wait for a relatively long time before they are executed. The small jobs have a higher relative latency impact (wait time compared to execution-time) than large jobs. Some users could consider this as failing to provide fairness between different types of jobs in the system.

Some users could adopt an opinion that preferences are satisfied by a system that executes jobs based on the execution-time parameter, i.e. using the SJF protocol as described herein. For example, when many of the jobs are small jobs, executing jobs according to the execution-time parameter could quickly finish execution those small jobs so that they do not need to wait for longer jobs to be finished.

However, the SJF protocol can impose additional requirements on system capabilities to be able to hibernate the internal execution state of the job (e.g. allocated memory content) so that the system becomes free for the other jobs. This can increase complexity of the system. It can also require additional resources (typically storage on disks) to be consumed for the duration of hibernated state of a job. Additionally, in some instances the SJF protocol could reduce fairness if a steady inflow of small jobs starves out the large jobs for a significant period of time.

Some users could adopt an opinion that preferences are satisfied by a system that executes jobs based on the RL protocol as described herein. For example, jobs in the system have a number of large jobs and small jobs, the RL protocol can strike a balance between the FIFO protocol and SJF protocol by accounting for both queue-time and execution-time in the scheduling of jobs.

To satisfy the various preferences of users in various circumstances the system could be configured for tunable scheduling of jobs. As described herein, because certain scheduling protocols can be preferred based on user preferences, the characteristics of the jobs being scheduled, and other factors, and because those factors can change in real time, a system for tunable scheduling can allow for the scheduling protocol to be adapted based on those characteristics.

A system for tunable scheduling can be configured to schedule a set of at least one job based on a scheduling factor. For example, the system can be configured to generate a scheduling factor for each job in the set and schedule the jobs based on the scheduling factor. The scheduling factor is a value assigned to each job for use in scheduling and can be based upon factors such as a queue-time parameter, the execution-time parameter and a schedule tuning parameter. In embodiments, the queue-time parameter is the length of time a job has been waiting in a system prior to being executed. The execution-time parameter is the total time it takes a computer system to execute a particular job. The schedule tuning parameter represents a selection by the system or by a user for how the system will generate the scheduling factor. In embodiments, the system could order the jobs in ascending order according to the scheduling factor. In certain embodiments, the system could schedule the jobs descending order according to the scheduling factor.

In embodiments, the scheduling factor is generated for each job according to an equation. For example, in embodiments, the scheduling factor is generated for each job in the set of at least one job according to the following equation:

$$SF = \frac{QT^{1-\frac{|TP|-TP}{2}}}{ET^{|TP|}}$$

Where QT is the queue-time parameter for each job, TP is the schedule tuning parameter for the set of at least one job, and ET is the execution-time parameter for each job. In certain embodiments, the scheduling factor can be generated based on other suitable equations depending upon the preferences of the user.

In embodiments, the value of the schedule tuning parameter configures the equation used to generate the scheduling factor. For example, in the equation, the value of the schedule tuning parameter TP determines how the scheduling factor SF is calculated. If the schedule tuning TP value is equal to −1, then the equation becomes:

1/ET

With the scheduling factor calculated in this manner, the system will schedule jobs based on the execution-time parameter. In embodiments where the system schedules the jobs in descending order of the scheduling factor value, the system will operate according to the SJF protocol.

If the schedule tuning value TP is equal to 0 then the equation becomes:

QT

With the scheduling factor calculated in this manner, the system will schedule jobs based on the queue-time parameter. In embodiments where the system schedules the jobs in descending order of the scheduling factor value, the system will operate according to the FIFO protocol.

If the schedule tuning value TP is equal to 1 then the equation becomes:

QT/ET

With the scheduling factor calculated in this manner, the system will schedule jobs based on the ratio of the queue-time parameter to the execution-time parameter. In embodiments where the system schedules the jobs in descending order of the scheduling factor value, the system will operate according to the RL protocol. In embodiments, the scheduling factor can be calculated by various different equations depending upon the preferences of the user.

In embodiments, the system can be configured to determine the value of the schedule tuning parameter TP based on a workload-time parameter. The workload-time parameter is a parameter describing the set of jobs based on the execution-time parameters for the individual jobs in the set. For example, in embodiments, the workload-time parameter is the average of each of the execution-time parameters in the set of jobs. In certain embodiments the workload-time parameter could be the median execution-time parameter or the mode of the execution-time parameters.

As described, the workload-time parameter can describe the set of jobs based on the execution-time parameters for that set of jobs. For example, a set of jobs for an analytics type workload could have a large number of jobs in the set with a large execution-time parameter. In embodiments, this set of jobs would have a large workload-time parameter. As described herein, a FIFO protocol could be preferred in this instance. A set of jobs for short term queries could have a large number of jobs in the set with a small execution-time parameters. In embodiments, this set of jobs would have a small workload-time parameter. As described herein, a SJF protocol could be preferred in that instance. A workload-time parameter which is neither large nor small could describe a mixed workload of jobs which contains a number of large execution-time jobs and small execution-time jobs. As described herein, the RL protocol could be preferred in that instance.

In embodiments, to determine the schedule tuning parameter, an upper threshold could be associated with a large workload-time parameter and a lower threshold could be associated with small workload-time parameter. In embodiments, if the workload-time parameter is outside of the upper threshold, the schedule tuning parameter is set to a first value which configures the system to operate according to a FIFO protocol. For example, in a system using the equation described herein to determine the scheduling factor, the schedule tuning parameter could be set to 0 in response to determining that the workload-time parameter is outside of the upper threshold. In embodiments, if the workload-time parameter is outside of the lower threshold, the schedule tuning parameter is set to a second value that configures the system to operate according to the SJF protocol. For example, in a system using the equation, the schedule tuning parameter TP could be set to −1 in response to determining that the workload-time parameter is outside of the lower threshold. In certain embodiments, if the workload-time parameter is between the upper and lower threshold, the schedule tuning parameter is set to a third value that configures the system to operate according to the RL protocol. For example, in a system using the equation, the schedule tuning parameter TP could be set to 1 in response to determining that the workload-time parameter is within the upper and lower threshold.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
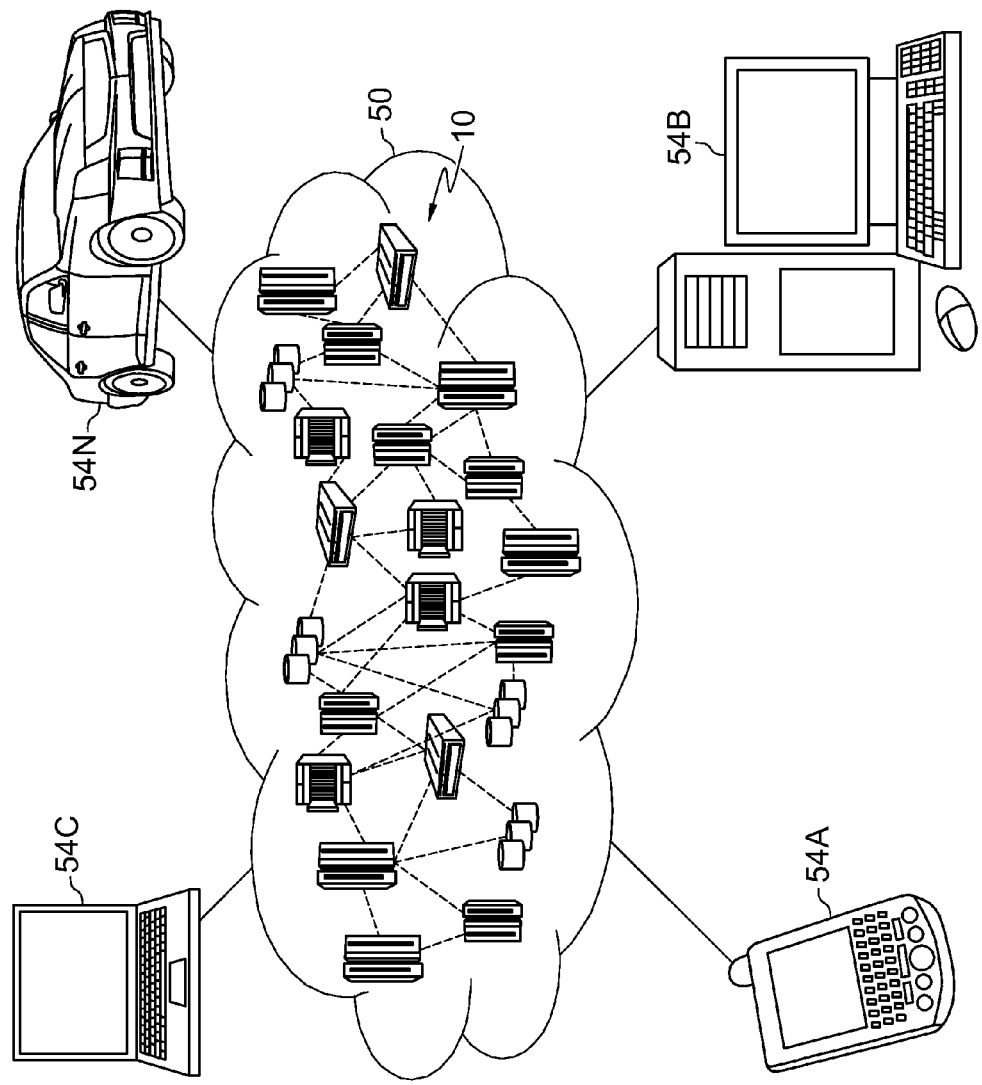
FIG. 2 depicts a cloud computing environment according to an embodiment of the present disclosure.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
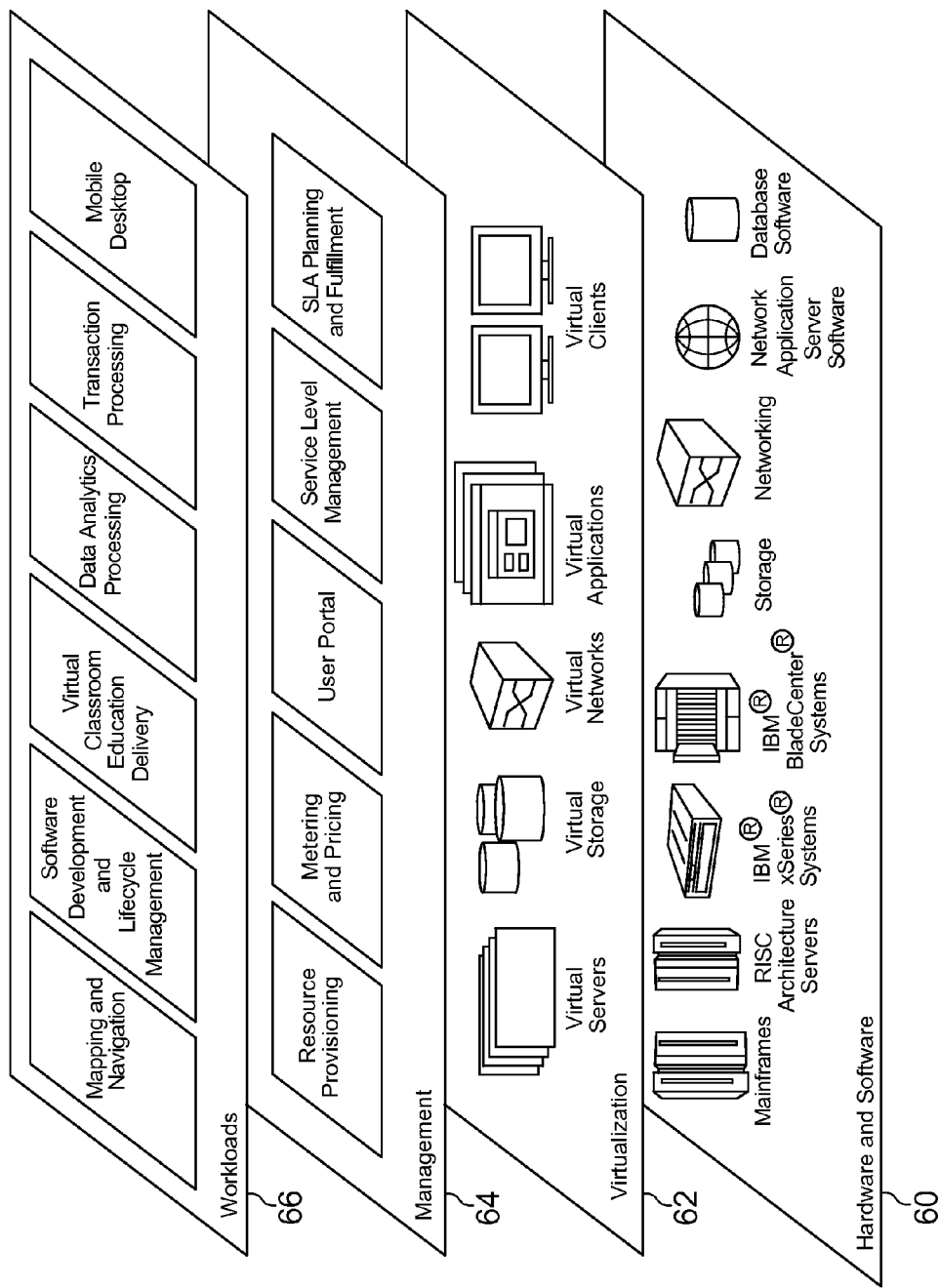
FIG. 3 depicts abstraction model layers according to an embodiment of the present disclosure.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. In embodiments, service level management can include the computer-implemented method of scheduling jobs, described further herein. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and mobile desktop.

Figure 4:
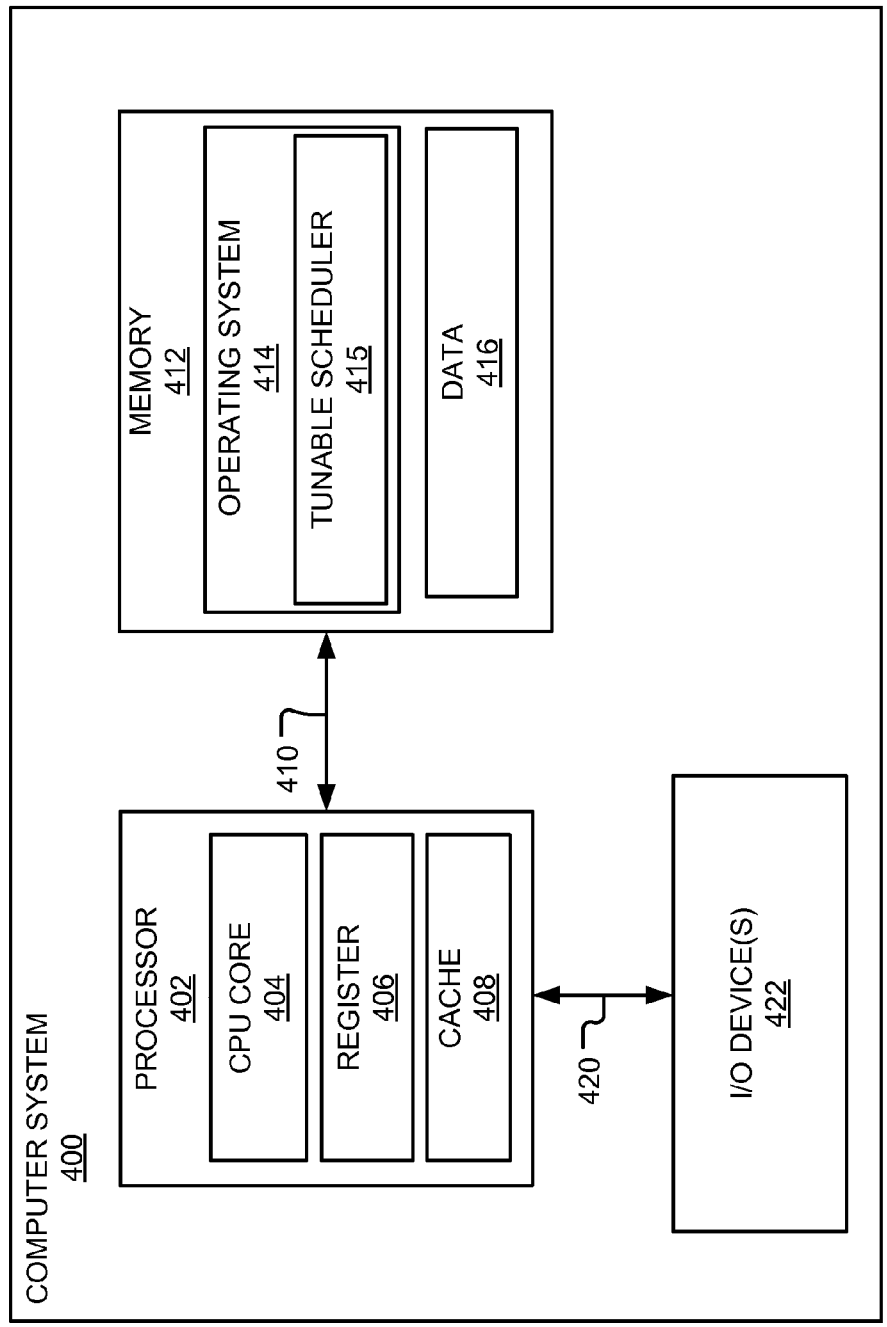
FIG. 4 depicts a computer system for tunable scheduling of a set of jobs according to embodiments of the present disclosure.

Referring now to FIG. 4, a computer system 400 for tunable scheduling of a set of jobs can be seen according to embodiments of the present disclosure. The system 400 can include a processor 402, a memory 412 and I/O (input/output) devices 422. In embodiments, the system 400 can a cloud computing node in a cloud computing environment 50 (FIG. 2), as described herein.

The processor 402 can execute instructions stored in memory 412 and perform various functions in the computer system 400. The processor 402 can include, but is not limited to, a CPU core 404, registers 406, and a cache 408. The CPU core 404 can provide logic for the processor 402. In some embodiments, the processor 402 can contain multiple CPU cores. The cache 408 and registers 406 can provide storage for data that is frequently accessed by the processor 402. In some embodiments, the computer processing system 400 can contain multiple processors 402 typical of a relatively large system. In some embodiments, the computer system 400 can be a single processor system. The processor 402 can include various types of processors such as, digital signal processor (DSP) hardware, network processor, application specific integrated circuit (ASIC), field programmable gate array (FPGA), or other types of processors. The memory 412 can be coupled to the processor 402 via a memory bus 410.

The memory 412 can include a random-access semiconductor memory, storage device, or storage medium (either volatile or non-volatile) for storing or encoding data and programs. The memory 412 can be conceptually a single monolithic entity, but in some embodiments the memory 412 can be a more complex arrangement, such as a hierarchy of caches and other memory devices. The memory 412 can store data, instructions, modules, and other types of information, hereafter collectively referred to as "memory elements." Although the memory elements are illustrated as being contained within the memory 412, in some embodiments some or all of them can be on different devices and can be accessed remotely, e.g., via a network.

The computer system 400 can use virtual addressing mechanisms that allow the programs of the computer system 400 to behave as if they only have access to a large, single storage entity instead of access to multiple, smaller storage entities. Thus, while the memory elements are illustrated as being contained within the memory 412, these elements are not necessarily completely contained in the same storage device at the same time. Further, although the memory elements are illustrated as being separate entities, in some embodiments some of them, portions of some of them, or all of them can be packaged together.

In embodiments, the memory elements can include an operating system 414 including a tunable scheduler module 415.

The tunable scheduler module 415 can be used to schedule jobs according to embodiments of the present disclosure. For example, the tunable scheduler module 415 can be configured to generate a scheduling factor for a set of jobs being executed in the computer system 400. In embodiments, the scheduling factor is a value generated for each job. The value of the scheduling factor can be used to arrange the jobs in a queue for execution by the computer system 400.

The scheduling factor can be generated by multiple processes. Depending upon the process used, different arrangements of jobs can be obtained. For example, the scheduling factor could be generated such that the set of jobs are scheduled based on a FIFO protocol. In examples, the scheduling factor can be generated such that the set of jobs are scheduled based on a SJF protocol. In certain examples, the scheduling factor can be generated such that the set of jobs are scheduled based on a RL protocol.

In embodiments, the scheduling factor can be generated based on a schedule tuning parameter to determine the process used to generate the scheduling factor. For example, as described herein, the scheduling factor can be generated according to the following equation:

$$SF = \frac{QT^{1-\frac{|TP|-TP}{2}}}{ET^{|TP|}}$$

Where QT is a queue-time parameter for each job, TP is the schedule tuning parameter for the set of at least one job and ET is an execution-time parameter for each job. In the equation, the schedule tuning parameter TP can be a value within a range of −1 to 1. If the tunable scheduler 415 determines that the schedule tuning parameter TP is equal to −1, then the scheduling factor is generated based on the execution-time parameter i.e. to create a SJF protocol based schedule. If the system 400 determines that the schedule tuning parameter TP is equal to 0, then the scheduling factor is generated based on the queue-time parameter i.e. to create a FIFO protocol based schedule. If the system 400 determines that the schedule tuning parameter is equal to 1, then the scheduling factor is generated based on a ratio of the queue-time parameter to the execution-time parameter, i.e. to create a RL protocol based schedule. In certain embodiments, various types of equations can be used to generate the scheduling factor and the schedule tuning parameter can be various values to tune the scheduling factor.

In embodiments, the schedule tuning parameter is a value determined by the computer system 400 based on a workload-time parameter for the set of jobs. As described herein, the workload-time parameter can describe the general characteristic of the set of jobs. In embodiments, if the workload-time parameter is outside of an upper threshold then the schedule tuning parameter is set to a first value which configures the system to schedule jobs according to the FIFO protocol. In embodiments, if the workload-time parameter is outside of a lower threshold then the schedule tuning parameter is set to a second value which configures the system to schedule jobs according to the SJF protocol. In embodiments, if the workload-time parameter is within the upper and lower thresholds then the schedule tuning parameter is set to a third value which configures the system to schedule jobs according to the RL protocol. In certain embodiments, the schedule tuning parameter can be selected manually by a user.

The processor 402 can also communicate with one or more I/O devices 422 via an I/O bus 420. The I/O devices 422 can include, but are not limited to, devices such as a keyboard, a pointing device, a display, one or more devices that enable a user to interact with the computer processing system 400, and various devices (e.g., network interface card, modem, etc.) that enable the computer processing system 400 to communicate with one or more other computing devices. It should be understood that other suitable hardware and software components can be used in conjunction with the computer processing system 400.

Figure 5A:
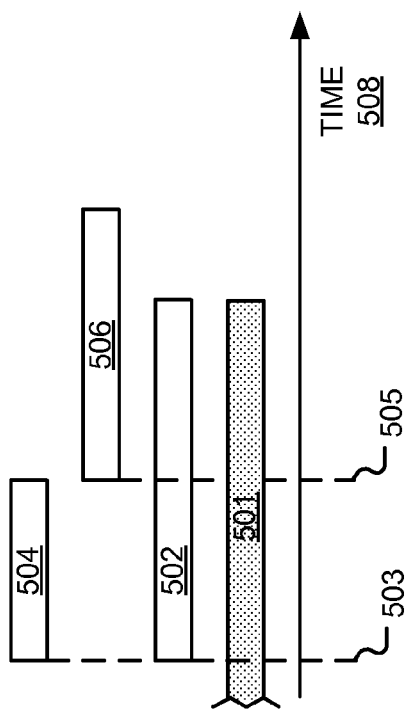
FIG. 5A depicts a timeline for a set of jobs in a computer system according to embodiments of the present disclosure.

Referring now to FIG. 5A, a timeline 508 for can be seen showing when a set of jobs are received in a computer system, according to embodiments of the present disclosure. The set of jobs includes a first job 501, a second job 502, a third job 504, and a fourth job 506. Each of the jobs are displayed as a bar which shows the execution-time required for that particular job. For example, among the second, third, and fourth jobs, the second job 502 has the largest execution-time parameter because the bar representing the second job 502 is longer than the bar representing the third job 504 and the fourth job 506.

In FIG. 5A the first job 501 is actively being executed in a computer system as described herein. Second, third and fourth job 502, 504, 506 are received in the system after the first job is being executed. Second job 502 and third job 504 are received at point 503. The fourth job 506 is received at point 505 on timeline 508. As described herein, the system can use scheduling protocols to arrange the order of execution of the second, third, and fourth jobs 502, 504, 506.

As described herein, in embodiments the system can arrange the jobs according to a RL protocol where the jobs are ordered based on a scheduling factor generated for each job from a ratio:

QT/ET

Where QT is the queue-time parameter and ET is the execution-time parameter.

As seen in FIG. 5A, the second job 502 has an execution-time parameter which is approximately twice as large as the third job 504 and one third larger than the third job 506. Additionally, the second job 502 has a queue-time parameter twice as long as the fourth job 506 and equal to the third job 504. Using the relative sizes of the execution-time parameter and the queue-time parameter for the second, third, and fourth jobs 502, 504, 506, the scheduling factor can be expressed as 2/2 for the second job 502, 2/1 for the third job, and 1/1.5 for the fourth job 506.

Figure 5B:
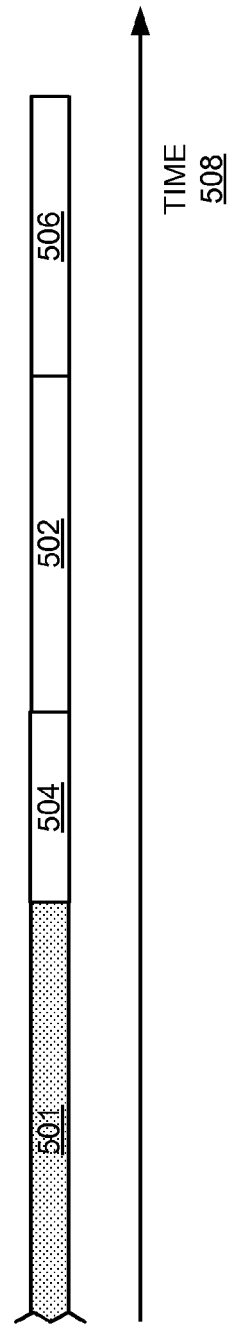
FIG. 5B depicts a timeline for a set of jobs in a computer system scheduled according to a relative latency protocol, according to embodiments of the present disclosure.

Referring now to FIG. 5B, a timeline 508 for a set of jobs in a computer system can be seen according to embodiments of the present disclosure. The timeline includes a first job 501, a second job 502, and a third job 504, and a fourth job 506. As described herein, the jobs can be ordered according to a scheduling factor. FIG. 5B displays the ordering of the jobs in descending order according to the scheduling factor generated above with reference to FIG. 5A. Thus, the system arranges the jobs in order with the third job 504 executing directly after the first job 501, the second job 502 executing directly after the third job 504, and the fourth job 506 executing directly after the second job 502.

Figure 6:
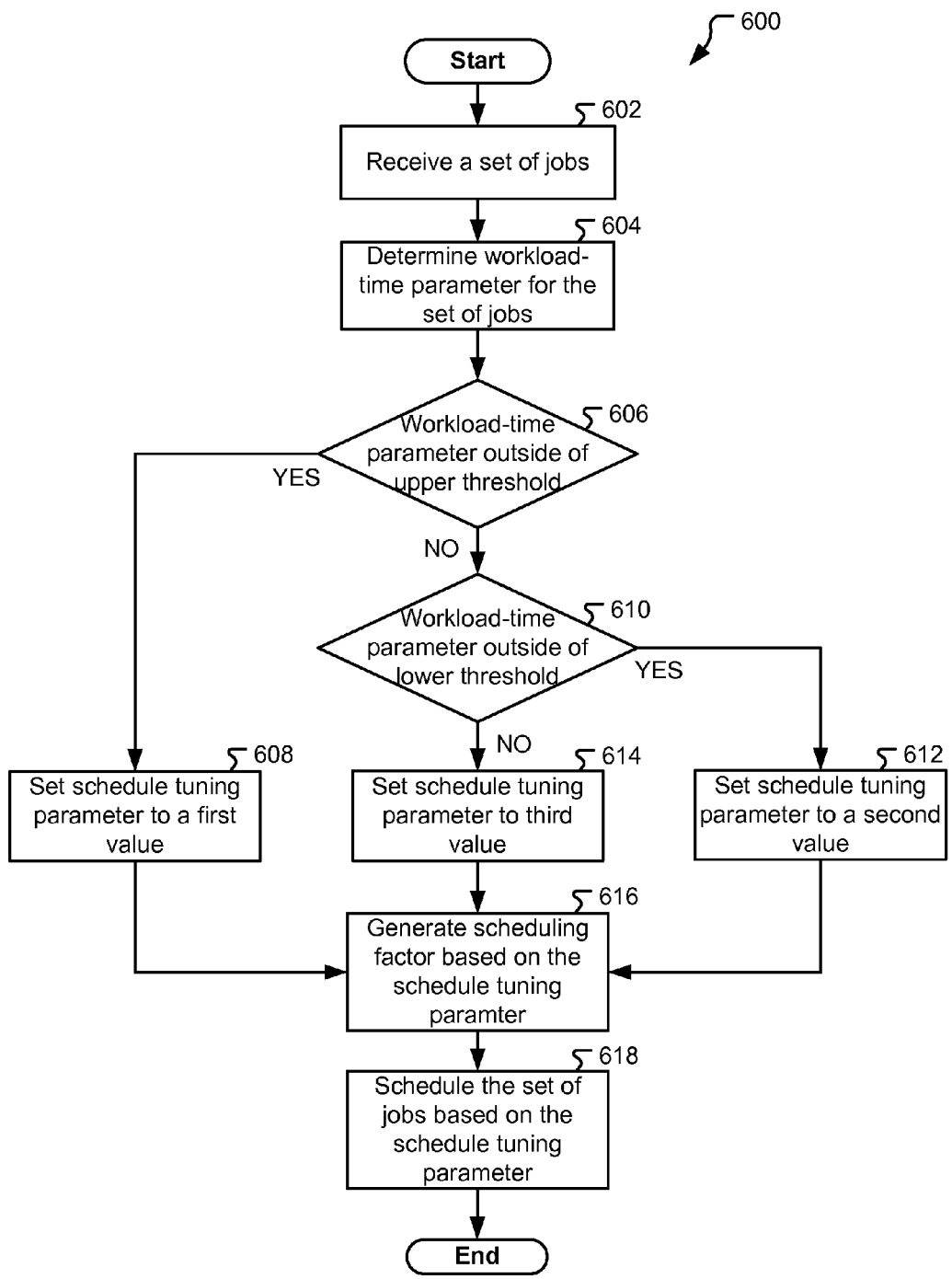
FIG. 6 depicts a flowchart diagram of a computer-implemented method for tunable scheduling of a set of jobs according to embodiments of the present disclosure.

Referring now to FIG. 6, a flowchart diagram of a computer-implemented method 600 for tunable scheduling of a set of jobs can be seen according to embodiments of the present disclosure. In operation 602, the computer system can receive a set of jobs. The jobs can be the same or substantially similar as described herein. In embodiments, the set of jobs can include one or more jobs. In operation 604, the computer system can determine a workload-time parameter for the set of jobs. The workload-time parameter can be the same or substantially similar as described herein.

If the workload-time parameter is outside of an upper threshold then, in decision block 606, the system can progress to operation 608. In operation 608, a schedule tuning parameter can be set to a first value. The schedule tuning parameter can configure how the system schedules the set of jobs as described herein. In embodiments, the value of the schedule tuning parameter can configure the system to schedule jobs in according to one scheduling protocol such as a FIFO protocol, a SJF protocol, and a RL protocol.

If the workload-time parameter is not outside the upper threshold then, in decision block 606, the method 600 can progress top decision block 610. If the workload-time parameter is outside of a lower threshold then, in decision block 610, the method 600 can progress to operation 612. In operation 612 the schedule tuning parameter can be set to a second value. In embodiments, the second value can configure the system to schedule jobs according to the SJF protocol, as described herein.

If the workload-time parameter is within the upper and lower thresholds then, in operation 610, the method 600 can progress to operation 614. In operation 614, the schedule tuning parameter can be set to a third value. In embodiments, the third value can configure the system to schedule jobs according to the RL protocol, as described herein.

In operation 616, a scheduling factor can be generated for each of the jobs based on the set schedule tuning parameter. The scheduling factor can be the same or substantially similar as described herein. The scheduling factor can be a value generated for each job which is used to order jobs for execution.

In operation 618, the system can schedule the set of jobs based on the scheduling factor. The system can schedule the jobs as described herein. In embodiments, the system can order the jobs in descending order according to the scheduling factor. In certain embodiments, the system can order the jobs in ascending order according to the scheduling factor.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA)

may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A system for scheduling a set of jobs in a computerized job scheduling system, the system comprising:
   a logic device configured to:
     receive a set of at least one job; and
   a tunable scheduler module configured to:
     determine a workload-time parameter for the set of at least one job;
     determine a schedule tuning parameter based on the workload-time parameter;
     generate a scheduling factor based on the schedule tuning parameter; and
     schedule each job in the set of at least one job based on the scheduling factor,
   wherein the tunable scheduler module being configured to generate the scheduling factor includes being configured to:
   generate a value for each job in the set of at least one job according to the following equation:

$$\frac{QT^{1-\frac{|TP|-TP}{2}}}{ET^{|TP|}}$$

QT being a queue-time parameter for each job, TP being the schedule tuning parameter for the set of at least one job, and ET being an execution-time parameter for each job.

2. The system of claim 1, wherein:
   the tunable scheduler module being configured to schedule each job in the set includes being further configured to:
   schedule the set of at least one job according to at least one scheduling order selected from a group consisting of, a first-in-first-out order, a shortest job first order, and a relative latency order.

3. The system of claim 1, wherein:
   the tunable scheduler module being configured to generate the schedule tuning parameter includes being configured to:
   determine that the workload-time parameter for the set of at least one job is outside of a lower threshold; and
   determine that the schedule tuning parameter is equal to a value of negative one in response to determining that the workload-time parameter for the set of at least one job is outside of the lower threshold.

4. The system of claim 1, wherein:
   the tunable scheduler module being configured to generate the schedule tuning parameter includes being configured to:
   determine that the workload-time parameter for the set of at least one job is outside of an upper threshold; and
   determine that the schedule tuning parameter is equal to a value of zero in response to determining that the workload-time parameter for the set of at least one job is outside of the upper threshold.

5. The system of claim 1, wherein:
   the tunable scheduler module being configured to generate the schedule tuning parameter includes being configured to:
   determine that the workload-time parameter for the set of at least one job is inside an upper threshold and a lower threshold; and
   determine that the schedule tuning parameter is equal to a value of one in response to determining that the workload-time parameter for the set of at least one job is inside the upper threshold and the lower threshold.

6. The system of claim 1, wherein:
the set of at least one job is a set of at least one batch job.

7. A computer program product for scheduling a set of jobs executed in a computer system, the computer program product comprising a computer readable storage medium having program instructions embodied therewith, the program instructions executable by a computer, to cause the computer to:
determine a workload-time parameter for a set of at least one job, the workload-time parameter relating to execution-time parameters for the set of at least one job;
determine a schedule tuning parameter for the set of at least one job, the schedule tuning parameter based on the workload-time parameter; and
generate a scheduling factor for each job in the set, the scheduling factor generated based on the schedule tuning parameter; and
schedule the set of at least one job based on the scheduling factor,
wherein the computer being caused to generate the scheduling factor includes being caused to:
generate a value for each job in the set of at least one job according to the following equation:

$$\frac{QT^{1-\frac{|TP|-TP}{2}}}{ET^{|TP|}}$$

QT being a queue-time parameter for each job, TP being the schedule tuning parameter for the set of at least one job, and ET being an execution-time parameter for each job.

8. The computer program product of claim 7, wherein:
the computer being caused to generate the schedule tuning parameter includes being caused to:
determine that the workload-time parameter for the set of at least one job is outside of a lower threshold; and
determine that the schedule tuning parameter is equal to a value of negative one in response to determining that the workload-time parameter for the set of at least one job is outside of the lower threshold.

9. The computer program product of claim 7, wherein:
the computer being caused to generate the schedule tuning parameter includes being caused to:
determine that the workload-time parameter for the set of at least one job is outside of an upper threshold; and
determine that the schedule tuning parameter is equal to a value of zero in response to determining that the workload-time parameter for the set of at least one job is outside of the upper threshold.

10. The computer program product of claim 7, wherein:
the computer being caused to generate the schedule tuning parameter includes being caused to:
determine that the workload-time parameter for the set of at least one job is inside an upper threshold and a lower threshold; and
determine that the schedule tuning parameter is equal to a value of one in response to determining that the workload-time parameter for the set of at least one job is inside the upper threshold and the lower threshold.

* * * * *